(12) United States Patent  
Enzien et al.

(10) Patent No.: US 9,065,950 B2  
(45) Date of Patent: Jun. 23, 2015

(54) COUNTERFEIT DETERRENCE USING FULL WIDTH ARRAY SCANS

(71) Applicant: Xerox Corporation, Norwalk, CT (US)

(72) Inventors: Mark F. Enzien, Penfield, NY (US); Gregg A. Bonikowski, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/260,515

(22) Filed: Apr. 24, 2014

(65) Prior Publication Data

US 2014/0233075 A1    Aug. 21, 2014

Related U.S. Application Data

(62) Division of application No. 12/113,361, filed on May 1, 2008, now Pat. No. 8,737,901.

(51) Int. Cl.
*G03G 21/04* (2006.01)
*H04N 1/00* (2006.01)

(52) U.S. Cl.
CPC ......... *H04N 1/00848* (2013.01); *G03G 21/046* (2013.01); *G03G 21/04* (2013.01)

(58) Field of Classification Search
CPC ............ H04N 1/0084; H04N 1/00843; H04N 1/00846; H04N 1/00848; G03G 21/04
See application file for complete search history.

(56) References Cited

U.S. PATENT DOCUMENTS

| | | | |
|---|---|---|---|
| 5,390,003 A | 2/1995 | Yamaguchi et al. | |
| 5,565,962 A | 10/1996 | Yoshimoto | |
| 5,621,503 A | 4/1997 | Komaki et al. | |
| 5,752,152 A | 5/1998 | Gasper et al. | |
| 5,909,602 A | 6/1999 | Nakai et al. | |
| 6,014,532 A | 1/2000 | Takeichi et al. | |
| 6,968,076 B1 | 11/2005 | OuYang et al. | |
| 7,054,568 B2 | 5/2006 | Mizes et al. | |
| 2002/0110381 A1 | 8/2002 | Maebashi et al. | |
| 2003/0077096 A1 | 4/2003 | Potter et al. | |
| 2004/0145726 A1 | 7/2004 | Csulits et al. | |
| 2005/0133593 A1* | 6/2005 | Estakhri et al. | 235/381 |
| 2005/0196187 A1 | 9/2005 | Mizes et al. | |
| 2006/0285863 A1 | 12/2006 | Noguchi et al. | |
| 2007/0122171 A1 | 5/2007 | Fujimori et al. | |

* cited by examiner

*Primary Examiner* — Daniel J Colilla
*Assistant Examiner* — Ruben Parco, Jr.
(74) *Attorney, Agent, or Firm* — Fay Sharpe LLP (57) ABSTRACT

Systems and methods are described that facilitate counterfeit deterrence in a printer or the like. A final image is scanned from a photoreceptor belt before or after transfer of the image to a print medium or from the print medium itself prior to output, and the scanned image data is assessed using a set of stored criteria to detect counterfeit signatures in the scanned image. Upon a determination that the scanned image includes a restricted image, and therefore contains one or more counterfeit image, the printer is shut down, electronically locked until serviced, and/or caused to damage or mark the printed counterfeit image(s).

20 Claims, 5 Drawing Sheets

COUNTERFEIT DETERRENCE USING FULL WIDTH ARRAY SCANS

CROSS-REFERENCE TO RELATED APPLICATIONS

This application claims the priority benefit, as a divisional application, of U.S. patent application Ser. No. 12/113,361 filed on May 1, 2008, the disclosure of which is incorporated herein by reference in its entirety.

BACKGROUND

The subject application relates to counterfeit detection and deterrence of production of counterfeit documents. While the systems and methods described herein relate to xerographic platforms, it will be appreciated that the described techniques may find application in other printing systems, other counterfeit detection systems, and/or other image analysis systems.

Every country has legal restrictions on the reproduction of banknote images. The counterfeiting of currency is a crime, and while restrictions vary from country to country, in some countries, any reproduction of banknote images—even for artistic or advertising uses—is strictly forbidden. Even in countries that allow some limited use of banknote images, there are specific rules and requirements.

A counterfeit deterrence system (CDS) has been placed by the Central Bank Counterfeit Deterrence Group (CBCDG) to deter the use of personal computers, digital imaging equipment, and software in the counterfeiting of banknotes. The CDS has been voluntarily adopted by hardware and software manufacturers, and prevents personal computers and digital imaging tools from capturing or reproducing the image of a protected banknote or other currency.

Counterfeit deterrence has been implemented in color printing products, relying on image processing in the scan or print path to detect banknotes and prevent them from being reproduced. These solutions typically require complete full page (or a portion of full page) images to be available in the submission, rip, and print process for analysis. The architecture of some printing systems, in particular high-end production systems, does not readily lend itself to this type of solution, especially for complex job structures. Moreover, conventional techniques do not analyze printed images.

Accordingly, there is an unmet need for systems and/or methods that facilitate overcoming the aforementioned deficiencies.

BRIEF DESCRIPTION

In accordance with various aspects described herein, systems and methods are described that facilitate deterring counterfeit production of restricted documents. For example, a method for deterring counterfeit reproduction of documents comprises scanning an image to be output from a printer, comparing the scanned image to a library of restricted images comprising counterfeit signatures, determining whether the scanned image includes a restricted image by detecting corresponding counterfeit signatures in the scanned image, and ceasing printer operation if the scanned image matches at least one restricted image.

According to another feature described herein, a counterfeit deterrence system comprises a scanner that scans an image to be output from a printer, a counterfeit detector that receives the scanned image and compares it to one or more stored criteria to detect counterfeit signatures and determine whether the scanned image includes a restricted image, and a process controller that selectively controls printer processes upon a determination that the scanned image includes a restricted image.

Yet another feature relates to an apparatus for counterfeit detection, comprising means for transferring an image to a print medium, means for scanning an image on at least one of the means for transferring the image to the print medium or the print medium itself, and means for assessing the scanned image against one or more stored criteria and determining whether the scanned image includes a counterfeit image. The apparatus further comprises means for impeding output of the final image on the print medium upon a determination that the scanned image is a counterfeit image.

DETAILED DESCRIPTION

Figure 1:
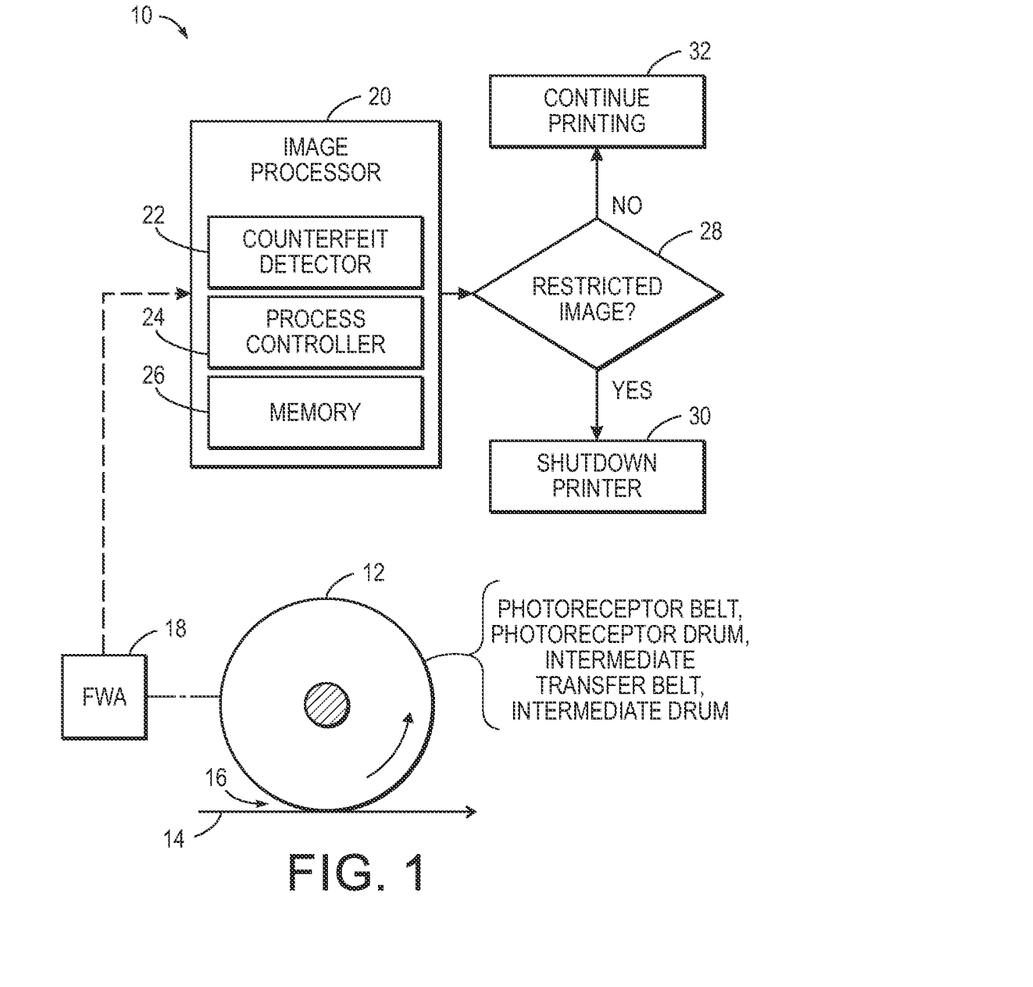
FIG. 1 illustrates a counterfeit deterrence system that prevents counterfeit document reproduction by analyzing printer output and includes a photoreceptor belt or drum (or intermediate transfer belt) that is positioned adjacent a paper path and imparts an image on paper at an image transfer point as the paper passes the belt, where the FWA scanner is positioned to read the image off the photoreceptor belt or drum (or intermediate transfer belt) prior to the image being transferred to paper (or other medium).

In accordance with various features described herein, systems and methods are described that facilitate detecting and preventing counterfeit production of documents using digital image processing software, hardware, and the like. With reference to FIG. 1, a counterfeit deterrence system 10 that prevents counterfeit document reproduction by analyzing printer output includes a photoreceptor belt or drum (or intermediate transfer belt or drum) 12 that is positioned adjacent a paper path 14 and imparts an image on paper at an image transfer point 16 as the paper passes the belt 12. It will be appreciated that the "photoreceptor belt" 12 may be a photoreceptor drum, an intermediate transfer belt, and intermediate transfer drum, etc., according to various embodiments described herein.

A full width array (FWA) scanner 18 is positioned at a leading side of the paper path 14 (e.g., upstream from the belt) and scans the belt to detect the image to be transferred to the paper. Although the scanner 18 is described herein as a FWA scanner, it will be appreciated that any suitable scanner with sufficient resolution can be employed in conjunction with the various systems, features, and aspects described herein. By positioning the FWA scanner 18 between the last development station or last intermediate transfer station (not shown)

and transfer point 16, a full page image can be captured and analyzed via known image processing algorithms to determine whether restricted images are being printed. That is, the complete or final image as transferred to a print medium (e.g., paper) is scanned and analyzed, in contrast to conventional systems and techniques that analyze partial or incomplete digital image data constructed at different times and locations in a printer.

In one embodiment, the FWA scanner 18 transmits image information detected from the belt 12 to an image processor 20 that includes a counterfeit detector 22 and a process controller 24. The counterfeit detector compares detected image data from the FWA scanner to a database or memory 26 having stored therein counterfeit indicator information (e.g., watermarks, holograms, multi-colored inks, embedded strips, other counterfeit prevention signatures, etc.) to determine whether a counterfeiting event is occurring. The process controller 24 periodically or continuously determines whether the image (or a portion thereof) detected by the FWA scanner 18 includes a restricted image, at 28. For instance, the process controller receive an indication from the counterfeit detector 22 that the detected image includes a restricted image, based on a comparison of the image to counterfeit indicator information stored in the memory 26. The memory 26 also stores counterfeit detection software for execution by the image processor 20 and various other components of the system.

According to an example, the memory 26 stores reference data and criteria for identifying counterfeit images, such that when the FWA scanner 18 detects an image on the belt 12 that meets the criteria for being a restricted image, a counterfeiting event is determined to be present and the process controller 24 shuts down the printer or device that is being used to counterfeit the document(s), at 30. If no counterfeit event is detected, then printing continues as normal, at 32. Similarity between a restricted image and the detected image can be determined using indicator information associated with the reference data and criteria, using known mechanisms, such as watermarks, holograms, serial numbers, portraits, font size and/or position of specific letters, numbers, and/or characters, etc.

In one embodiment, similarity above a predetermined threshold will trigger the process controller 24 to stop printing. For instance, different counterfeit indicators can be weighted and evaluated to determine a level of similarity between the detected image and one or more restricted images. In this manner, a detected image of a paper currency can trigger a printer shutdown, while printing of a detected image of a photo of paper currency used in an advertisement with other imagery and/or text can be permitted to continue.

If processing time requirements and/or FWA scanner placement do not allow the printer to be shut down before transfer of the image is complete, various actions can be taken, up to and including "locking out" the system from further printing, and requiring the customer to contact the manufacturer to unlock the system.

In FIG. 1, the FWA scanner 18 captures images off the xerographic or intermediate transfer belt before transfer, at a point where the full image has been placed on the belt. Each page image is captured by the FWA scanner, and image data is sent to one or more image processors 20. The counterfeit detector determines whether the page being printed contains any restricted images. If no restricted images are found, printing proceeds as usual. If any restricted images are detected, the printer is shutdown. Even if the sheet is through transfer by the time counterfeit images are detected, shutdown may occur before the image is (fully) fused, or before the second side of a duplex image can be transferred.

In a related embodiment, the FWA scanner 18 can be placed after one or more, but not necessarily all, separations of the image have been placed on the belt. In this embodiment, it is desirable that the detection of a restricted image be reliably performed without all color separations.

In another embodiment, one or more FWA scanners are employed at various points in the printing process. In other embodiments, modification of existing counterfeit detection algorithms can be employed for analyzing reverse images, latent images, or images with limited separations.

The counterfeit deterrence system 10 facilitates evaluation of the full page image independent of the manner in which various document elements (e.g., variable data) are managed in the raster image processing (RIP) and image path. This is useful since, in many printing system architectures, a fully resolved electronic image of the page to be printed does not necessarily exist anywhere in the system at a single point in time. The system also facilitates counterfeit deterrence without impacting document RIP time, and can be used for all document and image formats supported by a printer in which the system 10 is employed, without incremental development or validation costs when adding new document formats or print paths. Moreover, the system and techniques described herein need not employ a time-variable image processing element in the real-time image path, thereby mitigating potential productivity impacts when printing images that are not restricted. Still furthermore, the FWA scanner 18 may be used for image quality and/or process controls applications.

A goal of conventional counterfeit deterrence systems is to disable printing of any restricted images (e.g., to stop the printing process before any restricted images are transferred to paper). Using the systems and techniques presented herein, some or all of a page may have been transferred to a sheet before it is determined that the page contained a restricted image. In this manner, the system 10 can: shutdown an associated printing machine before the second side of a duplexed sheet can be printed; shut down the printer in such as way as to physically damage any already-transferred sheets containing restricted images, so that these sheets cannot be re-fed into the system to print the second side; fault the machine so that recovery requires reporting of the specific fault condition to the printer manufacturer; etc.

Figure 2:
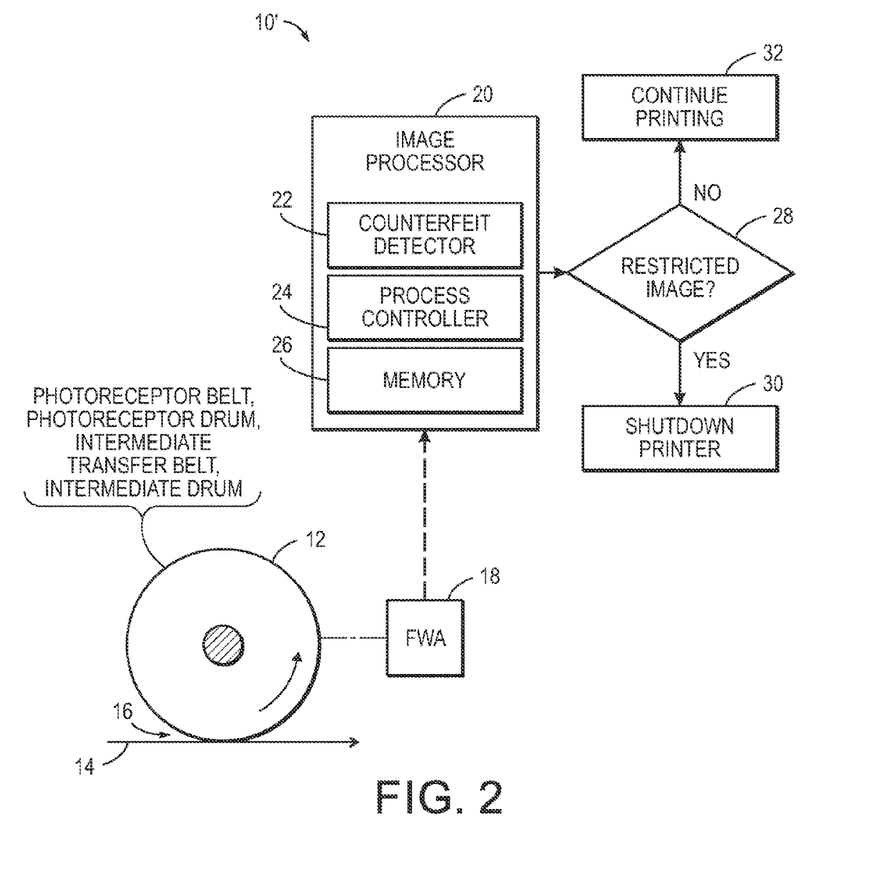
FIG. 2 is an illustration of the system wherein the FWA scanner is positioned to read the latent image remaining on the photoreceptor belt or drum (or intermediate transfer belt) following transfer of the image to paper (or other medium).

FIG. 2 is an illustration of a system 10' wherein the FWA scanner 18 is positioned downstream from the photoreceptor belt or drum 12 on the paper path 14. The system comprises the photoreceptor belt or drum 12, which transfers one or more images to sheets of paper as the sheets pass through a transfer point 16. The FWA scanner 18 scans the belt after image transfer to collect data associated with latent images on the belt. For instance, the FWA scanner captures images off the xerographic or intermediate transfer belt after transfer to paper, and transmits the captured image data to the image processor 20. The counterfeit detector compares the captured latent image data and compares it to counterfeit indicia stored in the memory 26. A determination is made, at 28, regarding whether the captured image data is significantly similar or identical to a restricted image. If so, then the process controller 24 shuts down a printer in which the system 10' is employed or takes other remedial action to prevent completion of the counterfeit print job. If the captured image does not match a restricted image, the printing continues unimpeded, at 32.

In other embodiments, the counterfeit detector 22 employs one or more machine-executable algorithms, which may be stored in the memory 26, to compare the captured image data to counterfeit indicia stored in the memory to evaluate whether a counterfeit condition is present. For instance, levels of similarity can be defined and compared to a predetermined threshold similarity level to determine whether the captured image data is similar enough to a restricted image to warrant preventative action.

Figure 3:
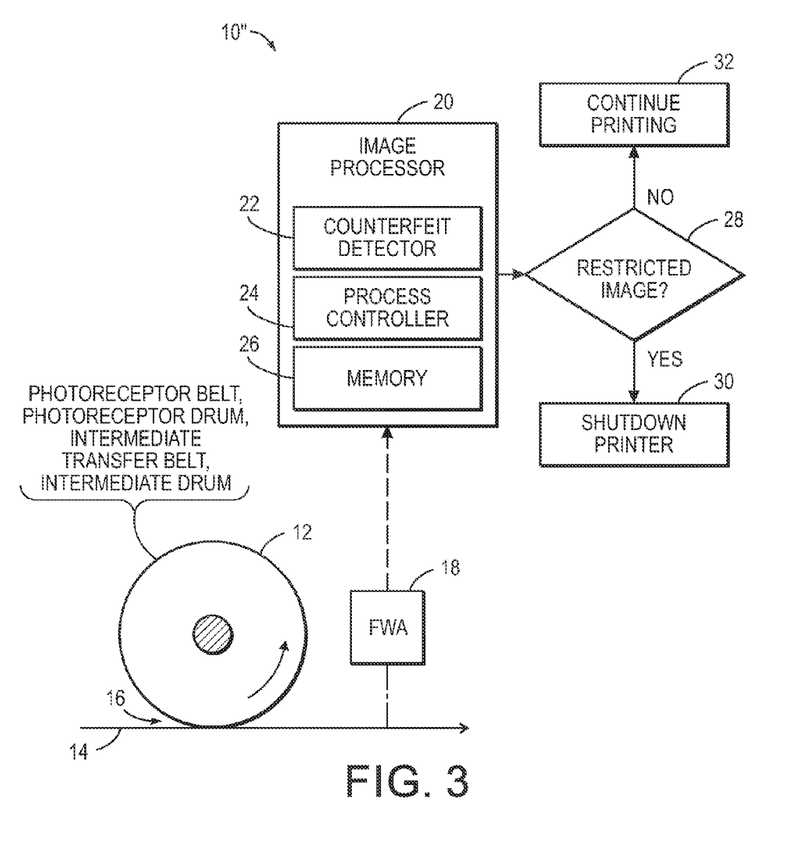
FIG. 3 is an illustration of the system, wherein the FWA scanner is positioned along the paper path downstream of the photoreceptor belt and captures image data from an image transferred to paper or other medium.

FIG. 3 is an illustration of a system 10", wherein the FWA scanner 18 is positioned along the paper path 14 downstream of the photoreceptor belt 12 and captures image data from an image transferred to paper or other medium. One advantage of scanning the output image on the printed sheet is that the counterfeit detection system can be externally mounted to the output of a printer and wired into the printer (e.g., power supply or the like) to shut it down upon detection of a counterfeit image.

The figure shows the photoreceptor belt or drum 12, which transfers one or more images to sheets of paper as the sheets pass through a transfer point 16. The FWA scanner 18 scans the sheets after transfer to collect image data from transferred images. For instance, the FWA scanner captures images from the paper after transfer, and transmits the captured image data to the image processor 20. The counterfeit detector compares the captured image data and compares it to counterfeit indicia stored in the memory 26. A determination is made, at 28, regarding whether the captured image data is significantly similar or identical to a restricted image based on criteria stored in the memory 26. If so, then the process controller 24 shuts down the printer in which the system 10" is employed or takes other remedial action to prevent completion of the counterfeit print job. If the captured image does not meet the criteria for being a restricted image, the printing continues as normal, at 32.

In related embodiments, the counterfeit detector 22 employs one or more machine-executable algorithms, which may be stored in the memory 26, to compare the captured image data to counterfeit indicia stored in the memory to evaluate whether a counterfeit condition is present. For instance, levels of similarity can be established and compared to a predetermined threshold similarity level to determine whether the captured image data is substantially similar to a restricted image to warrant preventative action.

The use of the FWA scanner, as described herein, in a printing engine for counterfeit detection differs from conventional systems or methods, which rely on analysis of document data prior to printing. Additionally, conventional systems and methodologies do not employ a FWA scanner to capture an image off a xerographic or intermediate transfer belt or a printed page for the purpose of counterfeit detection and deterrence.

Figure 4:
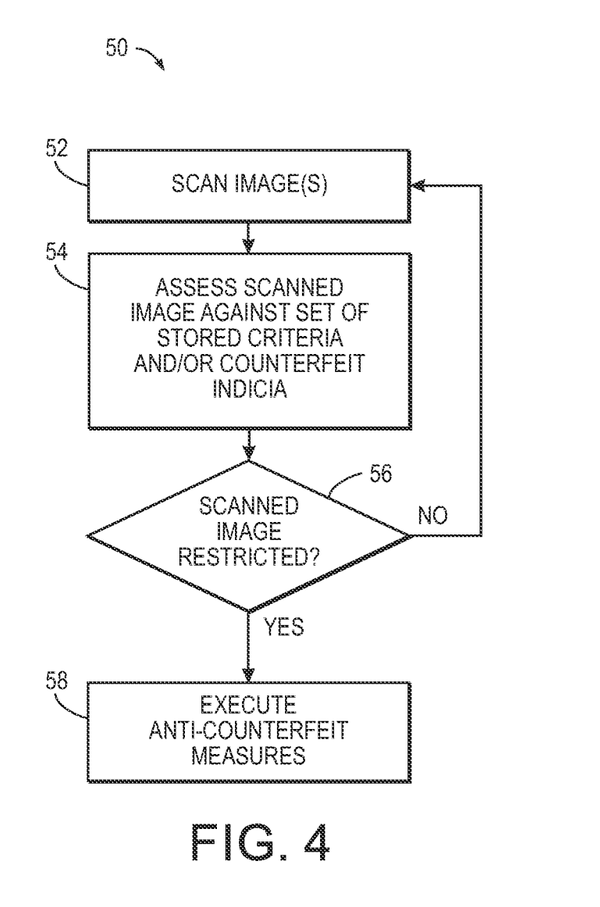
FIG. 4 illustrates a method related to detecting restricted images during a printing process and deterring document counterfeiting, in accordance with various features.

FIG. 4 illustrates a method related to detecting restricted images during a printing process and deterring document counterfeiting, in accordance with various features. While the methods are described as a series of acts, it will be understood that not all acts may be required to achieve the described goals and/or outcomes, and that some acts may, in accordance with certain aspects, be performed in an order different that the specific orders described.

At 52, images are scanned using a full width array (FWA) scanner or the like. In one embodiment, the scanner is positioned to scan the while they are on a photoreceptor belt, as described with regard to FIGS. 1 and 2. In another embodiment, the scanner scans the images after they are printed on a page or sheet (e.g., after being run past the belt, which transfers the image(s) to the page).

At 54, a scanned image is assessed against a set of stored criteria to determine whether all or a portion of the image contains counterfeit signature(s). In one embodiment, a restricted image library includes counterfeit indicia, such as information related to anti-counterfeit measures (e.g., embedding strips, watermarks, holograms, microchips, serial numbers, anti-counterfeit graphics, etc.). The indicia can be weighted and/or summed to determine a level of similarity between the scanned image and the restricted image, and the aggregate similarity value can be compared to a predetermined threshold to determine whether the image is scanned similar enough to warrant printer shutdown or other remedial action.

At 56, a determination is made regarding whether the scanned image matches a restricted image based on the comparison at 54. If the scanned image does not match a restricted image, then the method reverts to 52 for continued monitoring. If the scanned image matches the restricted image, then at 58 anti-counterfeit measures are executed. The anti-counterfeit measures may include, without being limited to, stopping a print job during which a restricted image is detected, shutting down and/or electronically locking the printer, requiring manufacturer or supplier service to unlock the printer, physically marking or damaging documents in which counterfeit or restricted images are detected, or a combination thereof.

Figure 5:
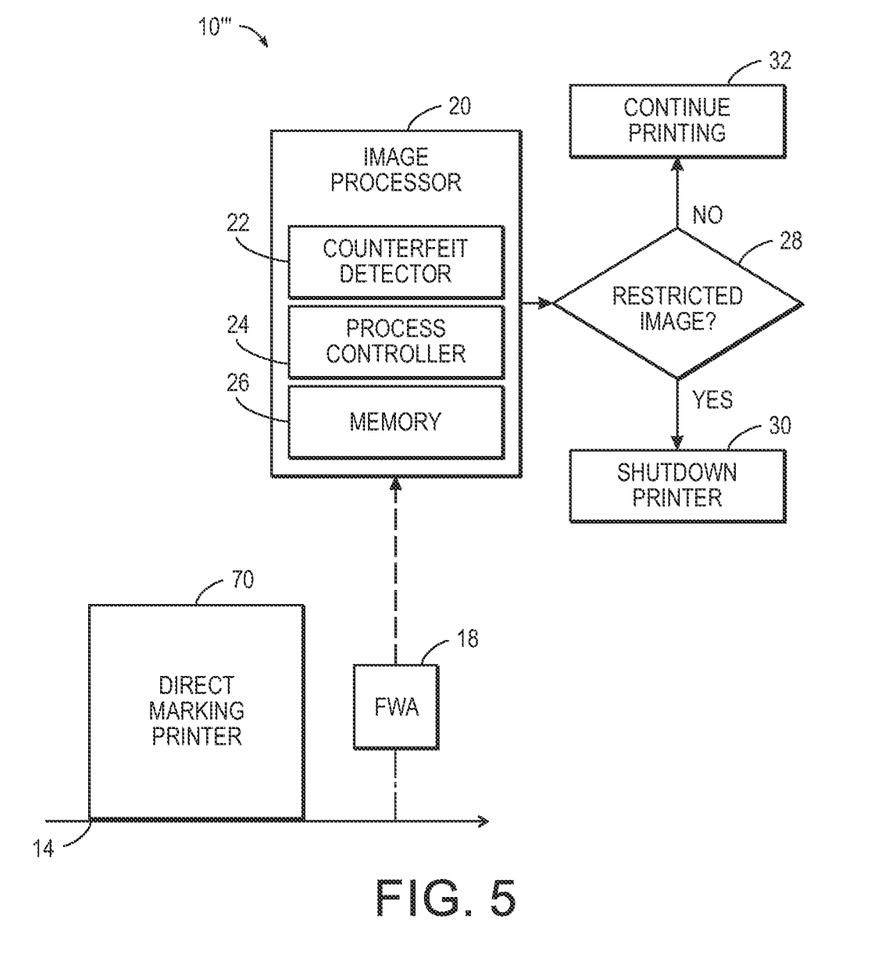
FIG. 5 is an illustration of a system, wherein the FWA scanner is positioned along the paper path downstream of a direct marking printer (e.g., an inkjet or the like) and captures image data from an image transferred to paper or other medium.

FIG. 5 is an illustration of a system 10''', wherein the FWA scanner 18 is positioned along the paper path 14 downstream of a direct marking printer 70 (e.g., an inkjet or the like) and captures image data from an image transferred to paper or other medium. An advantage of scanning the output image on the printed sheet is that the counterfeit detection system can be externally mounted to the output of a printer and wired into the printer (e.g., power supply or the like) to shut it down upon detection of a counterfeit image.

The figure shows the direct marking printer 70, which transfers one or more images to sheets of paper as the sheets pass through or adjacent to it. The FWA scanner 18 scans the sheets after image transfer to collect image data from transferred images. For instance, the FWA scanner captures images printed on the sheets, and transmits the captured image data to the image processor 20. The counterfeit detector compares the captured printed image data and compares it to counterfeit indicia stored in the memory 26. At 28, a determination is made regarding whether the captured image data is significantly similar or identical to a restricted image based on criteria stored in the memory 26. If so, then the process controller 24 shuts down the printer in which the system 10''' is employed or takes other remedial action to prevent completion of the counterfeit print job. If the captured image does not meet the criteria for being a restricted image, the printing continues as normal, at 32.

In related embodiments, the counterfeit detector 22 employs one or more machine-executable algorithms, which may be stored in the memory 26, to compare the captured image data to counterfeit indicia stored in the memory to evaluate whether a counterfeit condition is present. For instance, levels of similarity can be established and compared to a predetermined threshold similarity level to determine whether the captured image data is substantially similar to a restricted image to warrant preventative action.

It will be appreciated that various of the above-disclosed and other features and functions, or alternatives thereof, may be desirably combined into many other different systems or applications. Also that various presently unforeseen or unanticipated alternatives, modifications, variations or improve-

The invention claimed is:

1. A method of deterring counterfeit reproduction of documents, comprising:
   scanning a complete, transferable image on an imaging member to be output from a printer to a print medium;
   capturing a scanned image corresponding to the complete, transferable image;
   comparing the scanned image to a defined set of counterfeit signatures;
   determining whether the scanned image includes a restricted image based upon a result of the comparison of the scanned image to the defined set of counterfeit signatures; and
   ceasing printer operation if the scanned image includes at least one restricted image.

2. The method of claim 1, further comprising scanning the complete, transferable image using a full width array (FWA) scanner.

3. The method of claim 1, further comprising electronically locking the printer and preventing further operation upon a determination that the scanned image includes a restricted image.

4. The method of claim 1, further comprising physically modifying printed sheets output by the printer upon a determination that the scanned image includes the at least one restricted image, wherein physically modifying the printed sheets comprises at least one of physically marking or physically deforming the printed sheets.

5. The method of claim 4, further comprising maintaining the printer in a locked state until unlocked by a supplier or manufacturer.

6. The method of claim 1, the imaging member comprises at least one of a photoreceptor belt, a photoreceptor drum, an intermediate transfer drum or intermediate transfer belt.

7. The method of claim 2, wherein the full width array scanner is arranged to view the imaging member subsequent to a last development station or to a last intermediate transfer station and prior to a transfer point of the complete, transferable image to the print medium.

8. The method of claim 2, wherein the full width array scanner is positioned upstream of the imaging member on a print medium path and scans the complete, transferable image on the imaging member prior to transfer of the complete, transferable image to the print medium.

9. A method of deterring counterfeit reproduction of documents, comprising:
   scanning, with a scanner, a full page image on an imaging member;
   capturing a scanned full page image corresponding to the full page image on the imaging member, wherein the full page image comprises a complete, transferable image as to be output by a printer to a print medium prior to transfer of the complete, transferable image to the print medium;
   comparing the scanned full page image to at least one stored criteria from an associated memory resulting in at least one corresponding criteria comparison;
   weighing the at least one corresponding criteria comparison resulting in at least one corresponding weighted criteria comparison;
   determining a level of similarity between the scanned full page image and at least one restricted image stored in the associated memory using the at least one corresponding weighted criteria comparison;
   determining whether the scanned full page image includes the at least one restricted image based at least in part on a determined level of similarity relative to a predetermined threshold stored in the associated memory; and
   selectively controlling printer processes upon a determination that the scanned full page image includes the at least one restricted image.

10. The method of claim 9, wherein the scanner is a full width array (FWA) scanner.

11. The method of claim 9, wherein the imaging member comprises at least one of an intermediate transfer belt, an intermediate transfer drum, a photoreceptor belt or a photoreceptor drum.

12. The method of claim 9, wherein the scanner is arranged to view the imaging member subsequent to a last development station or to a last intermediate transfer station and prior to a transfer point of the complete, transferable image to the print medium.

13. The method of claim 9, further comprising:
   electronically locking the printer preventing further operation upon the determination that the scanned image includes the at least one restricted image; and
   maintaining the printer in a locked state until unlocked by a supplier or manufacturer.

14. The method of claim 9, wherein the scanner is positioned upstream of the imaging member on a print medium path and scans the complete, transferable image on the imaging member prior to transfer of the complete, transferable image to the print medium.

15. A method of deterring counterfeit reproduction of documents, comprising:
   scanning a complete, transferable image on an imaging member to be output by a printer to a print medium so as to scan the complete, transferable image;
   capturing a scanned image corresponding to the complete, transferable image;
   comparing the scanned image to at least one stored criteria resulting in at least one criteria comparison;
   weighing the at least one criteria comparison resulting in at least one corresponding weighted criteria comparison;
   determining a level of similarity between the scanned image and at least one restricted image stored in an associated memory using the at least one corresponding weighted criteria comparison;
   determining whether the scanned image includes the at least one restricted image based at least in part on a determined level of similarity relative to a predetermined threshold stored in the associated memory; and
   ceasing printer operation upon a determination that the scanned image includes the at least one restricted image.

16. The method of claim 15, wherein ceasing printer operation further comprises:
   electronically locking the printer preventing further operation upon a determination that the scanned image includes the at least one restricted image; and
   maintaining the printer in a locked state until unlocked by a supplier or manufacturer.

17. The method of claim 15, further comprising physically modifying printed sheets output by the printer upon the determination that the scanned image includes the at least one restricted image, wherein physically modifying the printed sheets comprises at least one of physically marking or physically deforming the printed sheets.

18. The method of claim 15, wherein the scanner is a full width array (FWA) arranged to view the imaging member subsequent to a last development station or to a last intermediate transfer station and prior to a transfer point of the complete, transferable image to the print medium.

19. The method of claim 15, wherein the scanner is a full width array (FWA) scanner positioned upstream of the imaging member on a print medium path and scans the complete, transferable image on the imaging member prior to transfer of the complete, transferable image to the print medium.

20. The method of claim 15, wherein the imaging member comprises at least one of an intermediate transfer belt, an intermediate transfer drum, a photoreceptor belt or a photoreceptor drum.

* * * * *